(12) United States Patent
Tsai et al.

(10) Patent No.: US 6,428,610 B1
(45) Date of Patent: Aug. 6, 2002

(54) HEPA FILTER

(75) Inventors: Peter Tsai, Knoxville, TN (US); Sanjiv R. Malkan, Plymouth, MA (US)

(73) Assignee: The University of Tennessee Research Corporation, Knoxville, TN (US)

( * ) Notice: Subject to any disclaimer, the term of this patent is extended or adjusted under 35 U.S.C. 154(b) by 0 days.

(21) Appl. No.: 09/484,864

(22) Filed: Jan. 18, 2000

(51) Int. Cl.[7] .............................. B03C 3/64; B29C 53/06
(52) U.S. Cl. .............................. 96/15; 55/486; 55/521; 55/524; 55/528; 55/DIG. 5; 55/DIG. 39; 96/66; 96/67; 96/69; 96/100; 264/151; 264/160; 264/466; 264/DIG. 48
(58) Field of Search .......................... 55/528, 486, 487, 55/524, 527, 520, 521, DIG. 5, DIG. 39; 96/15, 67, 69, 66, 100; 264/466, 471, 441, 148, 151, 160, DIG. 48

(56) References Cited

U.S. PATENT DOCUMENTS

| | | | | |
|---|---|---|---|---|
| 3,246,457 A | * | 4/1966 | De Baun | 55/DIG. 5 |
| 4,215,682 A | * | 8/1980 | Kubik et al. | 55/528 X |
| 4,707,167 A | * | 11/1987 | Saito et al. | 55/521 X |
| 4,904,174 A | * | 2/1990 | Moosmayer et al. | 264/441 X |
| 5,122,048 A | * | 6/1992 | Deed | 264/441 X |
| 5,401,446 A | | 3/1995 | Tsai et al. | 361/225 X |
| 5,709,735 A | * | 1/1998 | Midkiff et al. | 55/DIG. 5 |
| 5,800,769 A | * | 9/1998 | Haskett | 55/DIG. 5 |

OTHER PUBLICATIONS

G–W. Qin, et al., "The Effect of Water–quenching of the Electrostatic Charging of Fibers and Fabrics during the Melt–blowing Process," *The Journal of The Textile Institute*, vol. 90, No. 2, 243–251, 1999.

Peter Ping–Yi Tsai, et al., "Theory and Techniques of Electrostatic charging of Melt–blown Nonwoven Webs," *TAPPI Journal*, vol. 81, No. 1, 274–278, Jan. 1998.

Peter Ping–Yi Tsai, et al., paper entitled "Comparison of Electrostatic Charging at Deferent Locations in the Melt Blowing Process" 24 pages, date no shown.

* cited by examiner

*Primary Examiner*—Richard L. Chiesa
(74) *Attorney, Agent, or Firm*—Duane Morris LLP

(57) ABSTRACT

The present invention is directed toward a filter media for a high efficiency particulate air ("HEPA") filter including a multiplicity of adjacent electrostatically charged piles of nonwoven fabric. The invention further includes a method of making a HEPA filter.

20 Claims, 4 Drawing Sheets

HEPA FILTER

BACKGROUND OF THE INVENTION

1. Field of the Invention

The present invention is directed toward a filter media for a high efficiency particulate air ("HEPA") filter comprising a multiplicity of adjacent electrostatically charged piles of nonwoven fabric. The invention further comprises a method of making a HEPA filter.

2. Description of the Prior Art

HEPA filters have been used to filter radioactive particles out of air streams. HEPA filters are employed in a variety of environments, including hospital operating theaters, electronic manufacturing clean rooms, and nuclear power plants. HEPA filters are employed to remove submicron size particles from the air. The term "HEPA filter," as used herein, refers to a filter that is capable of filtering out at least 99.97% of 0.3 micron size particles, as evidenced by a DOP test.

Fine glass fiber paper has traditionally been used in HEPA filters as well as in ultra low penetration air ("ULPA") filters. The term "ULPA filter," as used herein, refers to a filter that is capable of filtering out 99.99% of 0.3 micron size particles, as evidenced by a DOP test.

The use of fine glass fiber paper in HEPA filters and in ULPA filters has many disadvantages, including brittleness during processing, heavy weight, high pressure drop, and skin irritation. An additional disadvantage of fine glass fiber paper in this application is that it cannot be electrostatically treated or charged. It has been shown that synthetic charged fibers are well suited as filters in heating, ventilating, and air conditioning ("HVAC") systems.

The present invention provides an improved filter media which is capable of meeting the filtration standards of HEPA filters and ULPA filters, while maintaining low pressure drops and low weight. Lower pressure drops result in energy savings. Lower weight results in lower transportation costs. Energy savings and lower transportation costs are advantages of the present invention.

An additional advantage of the present invention is that the material costs are less than 10% the material costs associated with fine glass fiber paper.

SUMMARY OF THE INVENTION

The present invention is directed to a particulate air filter media comprising a first pile of charged nonwoven fabric having a weight in the range of 5–40 grams per square meter and one or more fibers having a diameter in the range of 1.5–2.0 microns. The term "charged," as used herein, refers to electrostatically charging.

The invention also comprises a second pile of nonwoven fabric having a weight in the range of 5–40 grams per square meter and one or more fibers having a diameter in the range of 1.5–2.0 microns, adjacent to said first pile. The invention further comprises a third pile of nonwoven fabric having a weight in the range of 5–40 grams per square meter and one or more fibers having a diameter in the range of 1.5–2.0 microns, adjacent to said second pile.

The present invention is also directed toward a method of making a particulate air filter. This method comprises charging at least three adjacent piles of nonwoven fabric, each of said piles having a weight in the range of 5–40 grams per square meter, and each of said piles comprising one or more fibers having a diameter in the range of 1.5–2.0 microns. This method further comprises collating a stiffening layer with said piles. The method embodiment of this invention further comprises bonding a stiffening layer of fabric to one of said piles to form a stiffened filter media having a top side and a bottom side. The stiffened filter media, comprising the piles of nonwoven fabric and the stiffening layer, is then scored. After scoring, the stiffened filter media is folded into a multiplicity of adjacent layers. The method of the present invention further comprises inserting a separator between adjacent layers.

DESCRIPTION OF THE DRAWINGS

FIG. 5b is a top cross sectional view of the embodiment shown in FIG. 5a.

DESCRIPTION OF THE PREFERRED EMBODIMENTS

Figure 1:
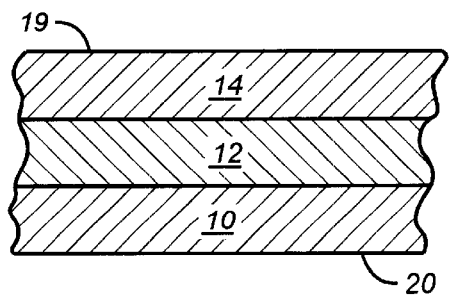
FIG. 1 is a side view of a first embodiment of the filter media of the present invention.

As shown in FIG. 1, the particulate air filter media embodiment of the present invention comprises a first pile of charged nonwoven fabric 10 having a weight in the range of 5–40 grams per square meter and one or more fibers having a diameter in the range of 1.5–2.0 microns. The electrostatic charging of the nonwoven fabric in the first layer may be accomplished by any method known in the nonwoven fabric arts, including but not limited to, those methods disclosed in U.S. Pat. Nos. 5,401,446 to Tsai, et al., U.S. Pat. No. 4,215,682 to Kubik, et al.; U.S. Pat. No. 4,904,174 to Moosmayer, et al., or U.S. Pat. No. 5,122,048 to Deeds. The disclosures of all of these patents is incorporated herein by reference. In a preferred embodiment, the charging is accomplished using the method and/or apparatus disclosed in U.S. Pat. No. 5,401,446.

As shown in FIG. 1, the invention also comprises a second pile of nonwoven fabric 12 having a weight in the range of 5–40 grams per square meter and one or more fibers having a diameter in the range of 1.5–2.0 microns, adjacent to said first pile. In a preferred embodiment, the fabric of a second pile is charged.

The invention further comprises a third pile 14 of nonwoven fabric having a weight in the range of 5–40 grams per square meter and one or more fibers having a diameter in the range of 1.5–2.0 microns, adjacent to said second pile. In a preferred embodiment, the fabric of the third pile is charged.

In a preferred embodiment, the nonwoven fabric of each pile is a meltblown fabric. In another preferred embodiment, the meltblown fabric comprises polypropelene.

Figure 2:
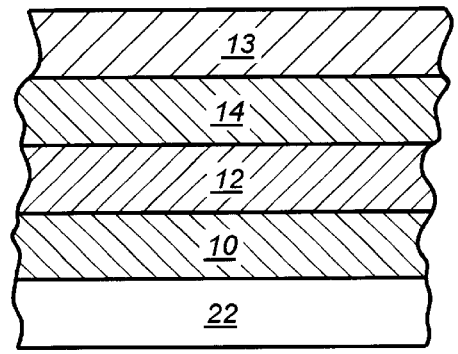
FIG. 2 is a side view of a second embodiment of the filter media of the present invention.

In a preferred embodiment, the filter media further comprises a fourth pile 13 adjacent to the third pile, as shown in FIG. 2. In this embodiment, the weight of each pile is less than or equal to 35 grams per square meter.

Figure 3:
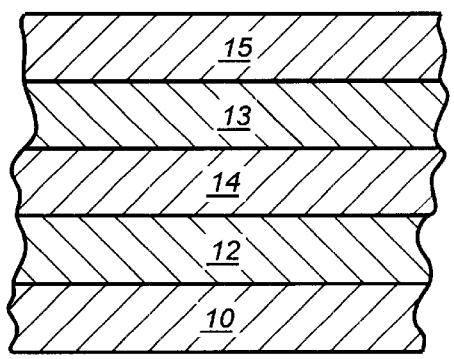
FIG. 3 is a side view of a third embodiment of the filter media of the present invention.

In a preferred embodiment, the filter media further comprises a fifth pile 15 adjacent to the fourth pile, as shown in FIG. 3. In this embodiment, the weight of each pile is less than or equal to 25 grams per square meter.

Figure 4:
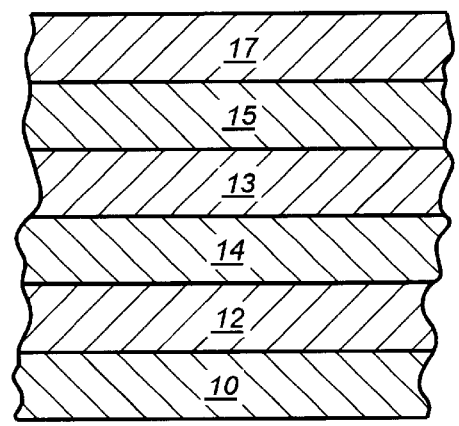
FIG. 4 is a side view of a fourth embodiment of the filter media of the present invention.

In a preferred embodiment, the filter media further comprises a sixth pile 17 adjacent to the fifth pile, as shown in FIG. 4. In this embodiment, the weight of each pile is less than or equal to 20 grams per square meter.

Figure 5A:
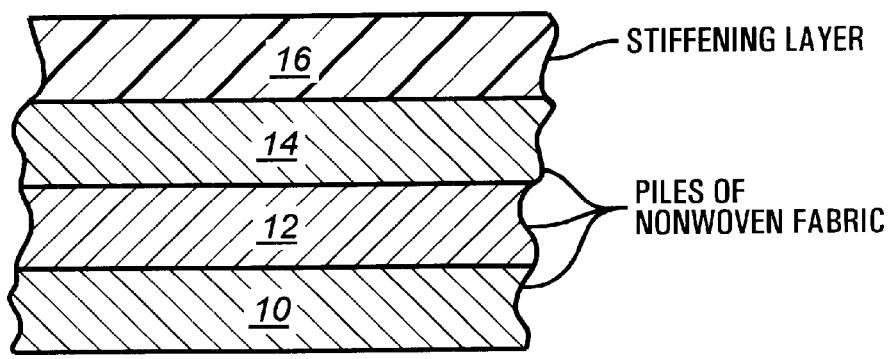
FIG. 5a is a side view of a first embodiment of the filter of the present invention.
Figure 5B:
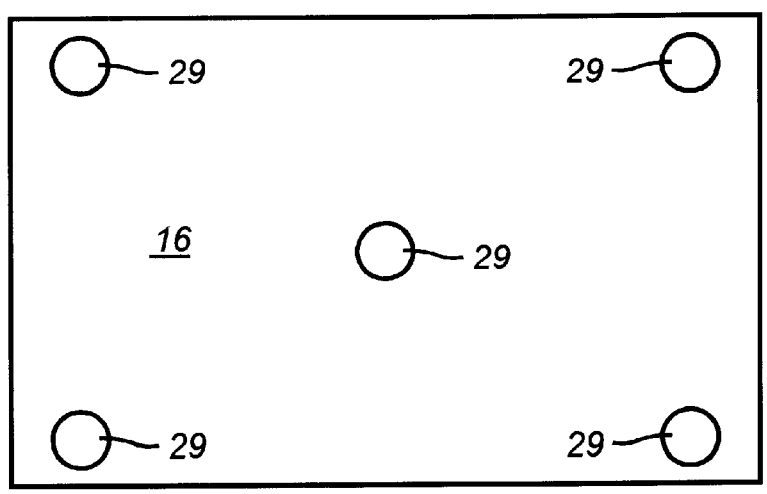

In a preferred embodiment, the invention further comprises a stiffening layer 16, as shown in FIG. 5a. In this embodiment, stiffening layer 16 is bonded to at least one of said piles such that the bonding area is in the range of 0.1% to 30% of the surface area of the bonded pile, as shown in FIG. 5b. In a preferred embodiment, the bonding is ultrasonic bonding and said bonding area is greater than or equal to 1% of the surface area of the bonded pile. The bonding area is represented by the circular regions 29 in FIG. 5b. In a preferred embodiment, the stiffening layer comprises a spunbond fabric.

In another embodiment, the invention is directed toward a particulate air filter comprising at least three adjacent piles 10, 12, 14 of nonwoven fabric. Each of these three piles has a weight in the range of 5–40 grams per square meter and comprises one or more fibers having a diameter in the range of 1.5–2.0 microns. These piles further comprise a first outer surface 19 and a second outer surface 20. In a preferred embodiment, the nonwoven fabric of each adjacent pile comprises meltblown polypropelene.

A preferred embodiment of the particulate air filter comprises a first stiffening layer 16 bonded to said first outer surface such that the bonding area is in the range of 0.1–30% of the surface area of the first outer surface. In a preferred embodiment, the invention further comprises a second stiffening layer 22 bonded to the second outer surface such that the bonding area is in the range of 0.1–30% of the surface area of the second outer surface, as shown in FIG. 5. In a preferred embodiment, the bonding area of the first stiffening layer to the first outer surface and the second stiffening layer to the second outer surface is in the range of 1%–30% of the surface area of the first and second outer surfaces, respectively.

The present invention is also directed toward a method of making a particulate air filter. In a first embodiment, this method comprises charging at least three adjacent piles of nonwoven fabric wherein each of the piles has a weight in the range of 5–40 grams per square meter and each of the piles comprises one or more fibers having a diameter in the range of 1.5–2.0 microns, as shown in Block 30 of FIG. 6. This method further comprises collating a stiffening layer of fabric with the piles, as shown in Block 32 of FIG. 6.

Figure 6:
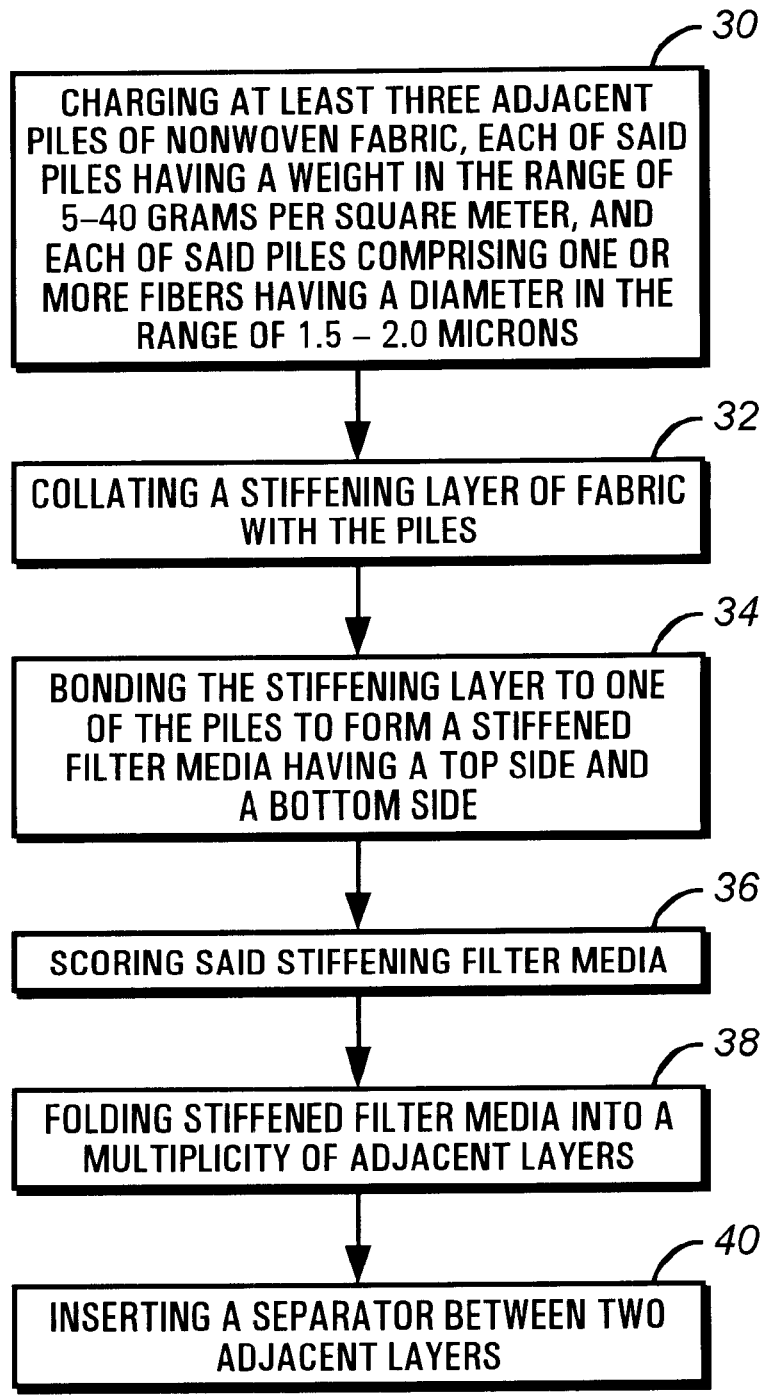
FIG. 6 is a block diagram of a first method embodiment of the present invention.

This method further comprises bonding the stiffening layer to one of the piles to form a stiffened filter media having a top side and a bottom side, as shown in Block 34 of FIG. 6. In a preferred embodiment, the bonding is ultrasonic bonding.

Figure 7:
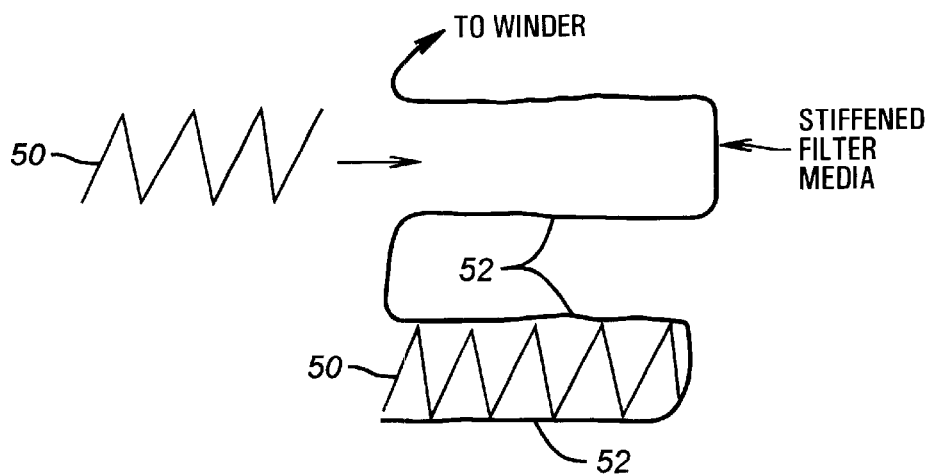
FIG. 7 is a side view of the folding and separating steps of the first method embodiment of the present invention.

This method further comprises scoring the stiffened filter media as shown in Block 32 of FIG. 6. This method further comprises folding the stiffened filter media into a multiplicity of adjacent layers 52 as shown in Block 38 of FIG. 6 and in FIG. 7. This method further comprises inserting a separator 50 between two adjacent layers, as shown in Block 40 of FIG. 6 and in FIG. 7. In a preferred embodiment, the separator is made from aluminum.

In a second method embodiment of the present invention directed toward making a particulate air filter, the first through fourth steps of the method are the same as those depicted in Blocks 30, 32, 34 and 36 of FIG. 6.

Figure 8A:
FIG. 8a is a side view of the gluing step of the second method embodiment of the present invention.
Figure 8B:
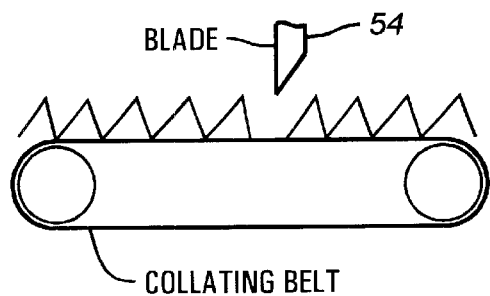
FIG. 8b is a side view of the folding step of the second method embodiment of the present invention.

This method further comprises applying glue to a side of the stiffened filter media as shown in FIG. 8a, folding the filter media into a series of V shaped pleats, as shown in FIG. 8b, and cutting the pleated filter media into a multiplicity of pieces having a predetermined size. In a preferred embodiment, the stiffened filter media is dried after gluing and prior to folding. In a preferred embodiment the cutting is performed with a cutting blade 54 positioned above the pleated filter media.

The pleated filter media shown in FIG. 8b may be used in cylindrical filters or cubical filters. For cubical filters, glue is applied to both sides of the stiffened filter media.

The foregoing disclosure and description of the invention are illustrative and explanatory. Various changes in the size, shape, and materials, as well as in the details of the illustrative construction may be made without departing from the spirit of the invention.

What is claimed is:

1. A particulate air filter media comprising:
   a. a first pile of charged nonwoven fabric having a weight in the range of 5–40 grams per square meter and one or more fibers having a diameter in the range of 1.5–2.0 microns;
   b. a second pile of nonwoven fabric having a weight in the range of 5–40 grams per square meter and one or more fibers having a diameter in the range of 1.5–2.0 microns, adjacent to said first pile;
   c. a third pile of nonwoven fabric having a weight in the range of 5–40 grams per square meter and one or more fibers having a diameter in the range of 1.5–2.0 microns, adjacent to said second pile; and
   d. a stiffening layer bonded to one of said piles.

2. The filter media of claim 1 further comprising a fourth pile adjacent to said third pile, and wherein the weight of each pile is less than or equal to 35 grams per square meter.

3. The filter media of claim 2 further comprising a fifth pile adjacent to said fourth pile and wherein the weight of each pile is less than or equal to 25 grams per square meter.

4. The filter media of claim 3 further comprising a sixth pile adjacent to said fifth pile, and wherein the weight of each pile is less than or equal to 20 grams per square meter.

5. The filter media of claim 1 wherein said nonwoven fabric is a meltblown fabric.

6. The filter media of claim 5 wherein said meltblown fabric comprises polypropelene.

7. The filter media of claim 1 wherein the bonding area of said stiffening layer is in the range of 0.1% to 30% of the surface area of the bonded pile.

8. The filter media of claim 7 wherein said bonding is ultrasonic bonding and said bonding area is greater than or equal to 1% of the surface area of the bonded pile.

9. The filter media of claim 7 wherein said stiffening layer comprises a spunbond fabric.

10. A particulate air filter comprising:
    a. at least three adjacent piles of charged nonwoven fabric, each of said piles having a weight in the range of 5–40 grams per square meter and comprising one or more fibers having a diameter in the range of 1.5–2.0 microns, said piles comprising a first outer surface and a second outer surface; and
    b. a first stiffening layer bonded to said first outer surface such that the bonding area is in the range of 0.1–30% of the surface area of said first outer surface.

11. The filter of claim 10, further comprising a second stiffening layer bonded to said second outer surface such that the bonding area is in the range of 0.1–30% of the surface area of said second outer surface.

12. The filter of claim 10, wherein said nonwoven fabric comprises meltblown polypropelene.

13. The filter of claim 10 further comprising a fourth pile adjacent to said second outer surface and wherein the weight of each pile is less than or equal to 35 grams per square meter.

14. The filter of claim 13 further comprising a fifth pile adjacent to said fourth pile and wherein the weight of each pile is less than or equal to 25 grams per square meter.

15. The filter of claim 14 further comprising a sixth pile adjacent to said fifth pile, and wherein the weight of each pile is less than or equal to 20 grams per square meter.

16. A method of making a particulate air filter comprising:
   a. charging at least three adjacent piles of nonwoven fabric, each of said piles having a weight in the range of 5–40 grams per square meter, and each of said piles comprising one or more fibers having a diameter in the range of 1.5–2.0 microns;
   b. collating a stiffening layer of fabric with said piles;
   c. bonding the stiffening layer to one of said piles to form a stiffened filter media having a top side and a bottom side;
   d. scoring said stiffened filter media;
   e. folding said stiffened filter media into a multiplicity of adjacent layers; and
   f. inserting a separator between two adjacent layers.

17. The method of claim 16 wherein said separator is made from aluminum.

18. The method of claim 16, wherein said bonding is ultrasonic bonding.

19. A method of making a particulate air filter comprising:
   a. charging at least three adjacent piles of nonwoven fabric, each of said piles having a weight in the range of 5–40 grams per square meter, and each of said piles comprising one or more fibers having a diameter in the range of 1.5–2.0 microns;
   b. collating a stiffening layer with said piles;
   c. bonding the stiffening layer of fabric to one of said piles to form a stiffened filter media having a top side and a bottom side;
   d. scoring said stiffened filter media;
   e. applying glue to a side of said stiffened filter media;
   f. folding said filter media into a series of V shaped pleats; and
   g. cutting said pleated filter media into a multiplicity of pieces having a predetermined size.

20. The method of claim 19 wherein said bonding is ultrasonic bonding.

* * * * *